United States Patent
Wickström (10) Patent No.: US 9,605,654 B2
(45) Date of Patent: Mar. 28, 2017

(54) WIND TURBINE LIFETIME ESTIMATOR

(75) Inventor: Anders Wickström, Karlstad (SE)

(73) Assignee: GENERAL ELECTRIC COMPANY, Schenectady, NY (US)

(*) Notice: Subject to any disclaimer, the term of this patent is extended or adjusted under 35 U.S.C. 154(b) by 1092 days.

(21) Appl. No.: 13/556,234

(22) Filed: Jul. 24, 2012

(65) Prior Publication Data
US 2014/0030089 A1    Jan. 30, 2014

(51) Int. Cl.
*F03D 7/02* (2006.01)
*F03D 7/04* (2006.01)

(52) U.S. Cl.
CPC ............ *F03D 7/0292* (2013.01); *F03D 7/042* (2013.01); *F03D 17/00* (2016.05); *F05B 2270/332* (2013.01); *Y02E 10/722* (2013.01); *Y02E 10/723* (2013.01)

(58) Field of Classification Search
CPC .................... F05B 2270/332; F03D 7/0292
USPC .......................................................... 416/31
See application file for complete search history.

(56) References Cited

U.S. PATENT DOCUMENTS

| 7,322,794 B2* | 1/2008 | LeMieux | F03D 11/00 415/118 |
| 2010/0138267 A1* | 6/2010 | Vittal | F03D 11/0091 702/184 |
| 2012/0029840 A1* | 2/2012 | George | F03D 11/0091 702/34 |

OTHER PUBLICATIONS

Nijssen, "Fatigue life prediction and strength degradation of wind turbine rotor blade composites", 2006.

* cited by examiner

*Primary Examiner* — Craig Kim
*Assistant Examiner* — Michael Sehn
(74) *Attorney, Agent, or Firm* — GE GLOBAL PATENT OPERATION; Douglas D. Zhang

(57) ABSTRACT

A method of operating at least one wind turbine is described, comprising: determining a plurality of stress events of at least one component of the at least one wind turbine; determining at least one accumulated stress from at least two of the plurality of stress events; determining at least one residual lifetime based at least partially on the at least one accumulated stress.

16 Claims, 4 Drawing Sheets

WIND TURBINE LIFETIME ESTIMATOR

BACKGROUND OF THE INVENTION

The subject matter described herein relates generally to methods and systems for performance control of wind turbines and wind parks, and more particularly, to methods and systems for control of the performance of wind turbines and/or wind parks.

Generally, a wind turbine includes a turbine that has a rotor that includes a rotatable hub assembly having multiple blades. The blades transform wind energy into a mechanical rotational torque that drives one or more generators via the rotor. The generators are sometimes, but not always, rotationally coupled to the rotor through a gearbox. The gearbox steps up the inherently low rotational speed of the rotor for the generator to efficiently convert the rotational mechanical energy to electrical energy, which is fed into a utility grid via at least one electrical connection. Gearless direct drive wind turbines also exist. The rotor, generator, gearbox and other components are typically mounted within a housing, or nacelle, that is positioned on top of a base that may be a truss or tubular tower.

Some wind turbine configurations include double-fed induction generators (DFIGs). Such configurations may also include power converters that are used to convert a frequency of generated electric power to a frequency substantially similar to a utility grid frequency. Moreover, such converters, in conjunction with the DFIG, also transmit electric power between the utility grid and the generator as well as transmit generator excitation power to a wound generator rotor from one of the connections to the electric utility grid connection. Alternatively, some wind turbine configurations include, but are not limited to, alternative types of induction generators, permanent magnet (PM) synchronous generators and electrically-excited synchronous generators and switched reluctance generators. These alternative configurations may also include power converters that are used to convert the frequencies as described above and transmit electrical power between the utility grid and the generator.

Known wind turbines have a plurality of mechanical and electrical components. Each electrical and/or mechanical component may have independent or different operating limitations, such as current, voltage, power, and/or temperature limits, than other components. Moreover, known wind turbines typically are designed and/or assembled with pre-defined rated power limits. To operate within such rated power limits, the electrical and/or mechanical components may be operated with large margins for the operating limitations. Such operation may result in inefficient wind turbine operation, and a power generation capability of the wind turbine may be underutilized.

BRIEF DESCRIPTION OF THE INVENTION

In one aspect, A method of operating at least one wind turbine is provided, comprising: determining a plurality of stress events of at least one component of the at least one wind turbine; determining at least one accumulated stress from at least two of the plurality of stress events; determining at least one residual lifetime based at least partially on the at least one accumulated stress.

In another aspect, a method of operating at least one wind turbine is provided, comprising: determining a plurality of stress events of at least one component of the at least one wind turbine; determining at least one accumulated stress from at least two of the plurality of stress events; and adjusting at least one operational setting of any of the at least one wind turbine; wherein the adjusting is at least partially based on the at least one accumulated stress In yet another aspect, a wind turbine is provided, comprising: a tower supporting a nacelle, the nacelle supporting at least one blade for receiving wind energy, and at least one controller; the controller is adapted for: determining a plurality of stress events of at least one component of the wind turbine, wherein the at least one component is a pitch, yaw, or generator component; determining at least one accumulated stress from at least two of the plurality of stress events; determining at least one of: at least one residual lifetime at least partially based on the at least one accumulated stress, and at least one consumed lifetime at least partially based on the at least one accumulated stress; and adjusting at least one operational setting of any of the at least one wind turbine.

Further aspects, advantages and features of the present invention are apparent from the dependent claims, the description and the accompanying drawings.

BRIEF DESCRIPTION OF THE DRAWINGS

A full and enabling disclosure including the best mode thereof, to one of ordinary skill in the art, is set forth more particularly in the remainder of the specification, including reference to the accompanying figures wherein.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system that determines accumulated stress that can be used in order to inform the further operation of the wind turbine, for example by adjusting the operation of the wind turbine to increase energy capture and/or reduce stress. In addition, embodiments described herein include a method of operating at least one wind turbine which can adjust operation, as appropriate, to increase annual energy production and/or increase the operational lifetime of the wind turbine.

As used herein, the term "histogram of stress events" is intended to be representative of data associated with stress events on a wind turbine and/or component thereof, such as a stress spectrum. As used herein, the term "blade" is intended to be representative of any device that provides a reactive force when in motion relative to a surrounding fluid.

As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from kinetic energy of wind to electrical power.

Figure 1:
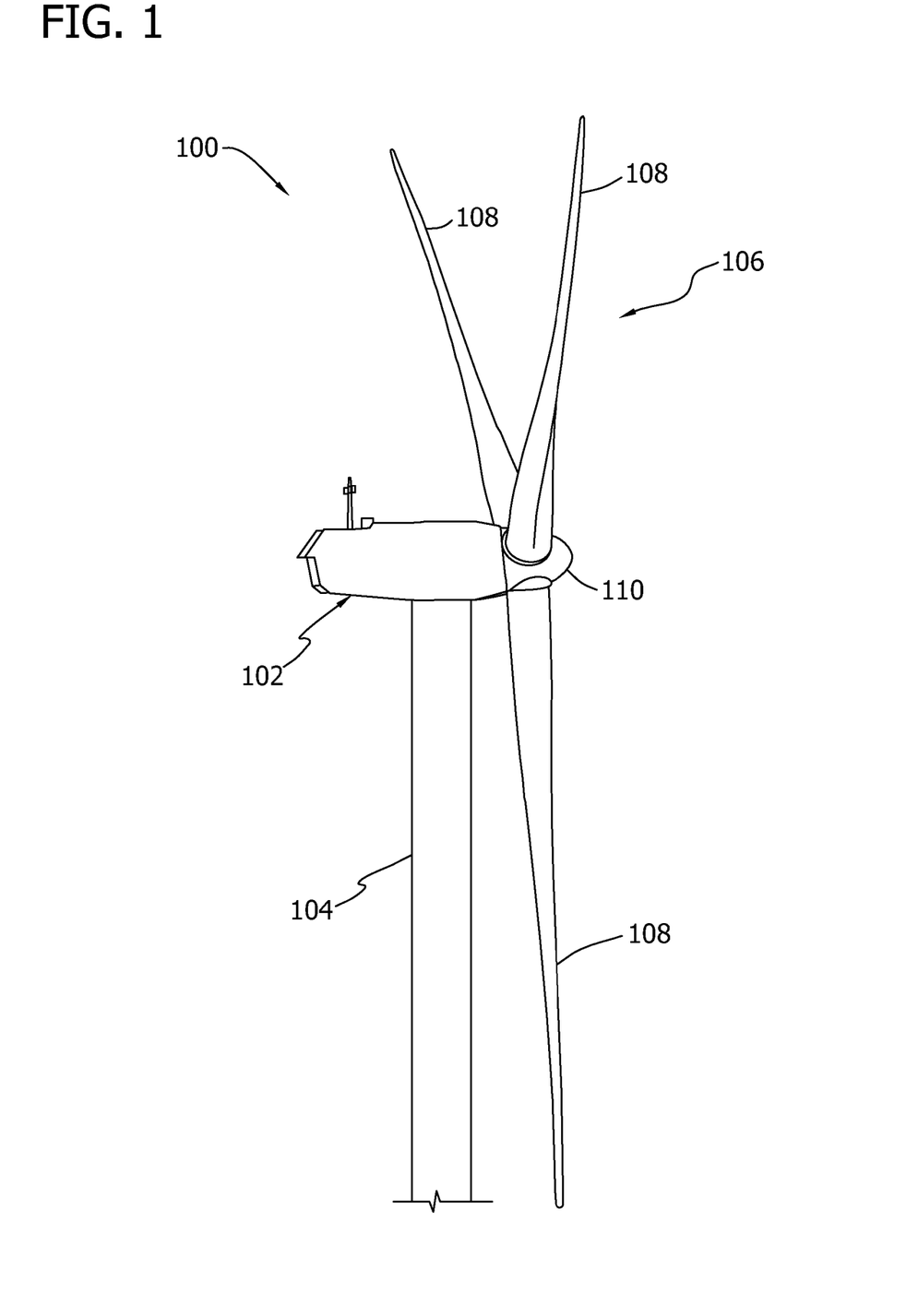
FIG. 1 is a perspective view of a portion of an exemplary wind turbine.

FIG. 1 is a perspective view of a portion of an exemplary wind turbine 100. Wind turbine 100 includes a nacelle 102 housing a generator (not shown in FIG. 1). Nacelle 102 is mounted on a tower 104 (a portion of tower 104 being shown in FIG. 1). Tower 104 may have any suitable height that facilitates operation of wind turbine 100 as described herein. Wind turbine 100 also includes a rotor 106 that includes three blades 108 attached to a rotating hub 110. Alternatively, wind turbine 100 includes any number of blades 108 that facilitates operation of wind turbine 100 as described herein. In the exemplary embodiment, wind turbine 100 includes a gearbox (not shown in FIG. 1) operatively coupled to rotor 106 and a generator (not shown in FIG. 1).

Figure 2:
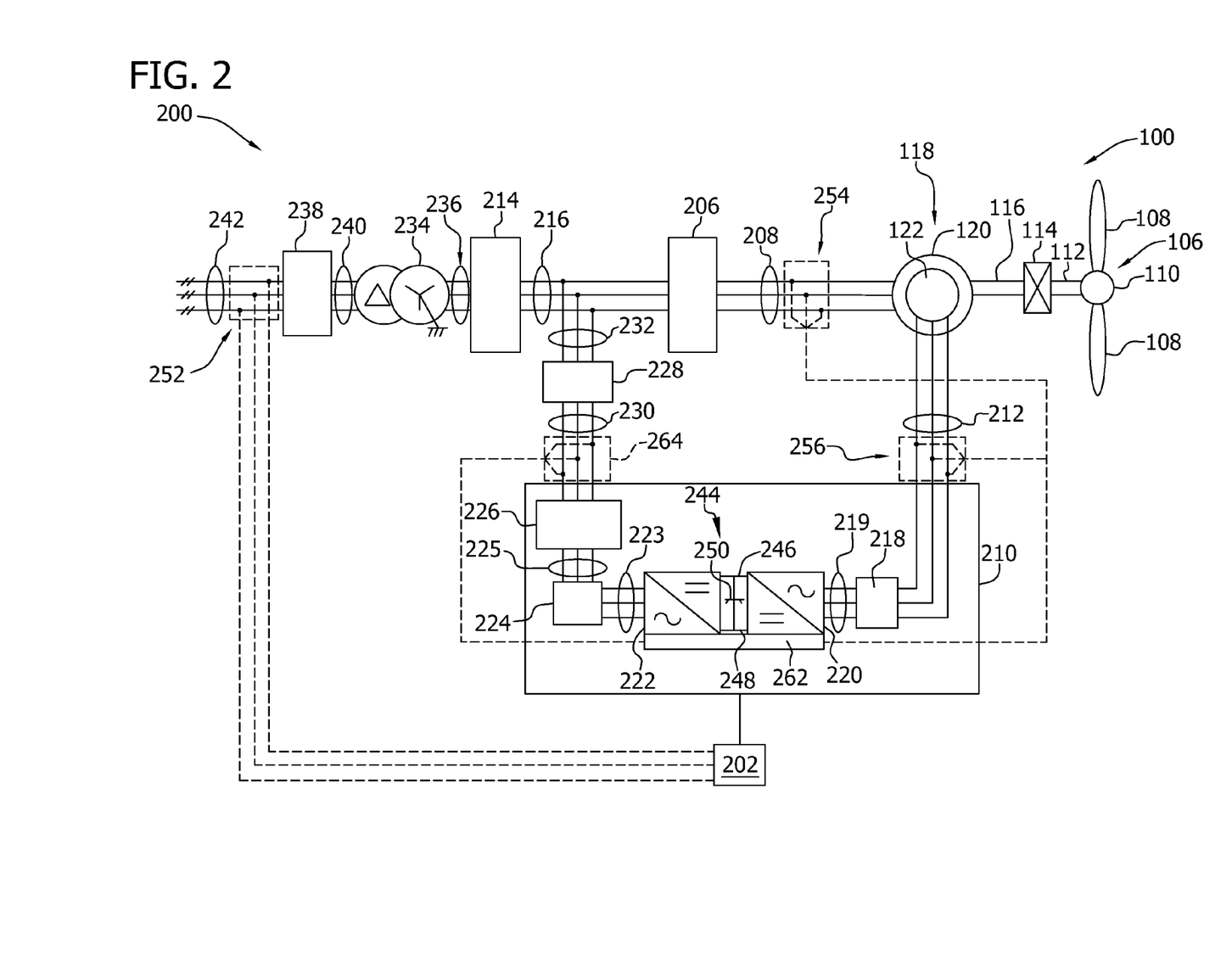
FIG. 2 is a schematic view of an exemplary electrical and control system suitable for use with the wind turbine shown in FIG. 1.

FIG. 2 is a schematic view of an exemplary electrical and control system 200 that may be used with wind turbine 100. Rotor 106 includes blades 108 coupled to hub 110. Rotor 106 also includes a low-speed shaft 112 rotatably coupled to hub 110. Low-speed shaft 112 is coupled to a step-up gearbox 114 that is configured to step up the rotational speed of low-speed shaft 112 and transfer that speed to a high-speed shaft 116. In the exemplary embodiment, gearbox 114 has a step-up ratio of approximately 70:1. For example, low-speed shaft 112 rotating at approximately 20 revolutions per minute (rpm) coupled to gearbox 114 with an approximately 70:1 step-up ratio generates a speed for high-speed shaft 116 of approximately 1400 rpm. Alternatively, gearbox 114 has any suitable step-up ratio that facilitates operation of wind turbine 100 as described herein. As a further alternative, wind turbine 100 includes a direct-drive generator that is rotatably coupled to rotor 106 without any intervening gearbox.

High-speed shaft 116 is rotatably coupled to generator 118. In the exemplary embodiment, generator 118 is a wound rotor, three-phase, double-fed induction (asynchronous) generator (DFIG) that includes a generator stator 120 magnetically coupled to a generator rotor 122. In an alternative embodiment, generator rotor 122 includes a plurality of permanent magnets in place of rotor windings.

Electrical and control system 200 includes a turbine controller 202. Turbine controller 202 includes at least one processor and a memory, at least one processor input channel, at least one processor output channel, and may include at least one computer (none shown in FIG. 2). As used herein, the term computer is not limited to integrated circuits referred to in the art as a computer, but broadly refers to a processor, a microcontroller, a microcomputer, a programmable logic controller (PLC), an application specific integrated circuit, and other programmable circuits (none shown in FIG. 2), and these terms are used interchangeably herein. In the exemplary embodiment, memory may include, but is not limited to, a computer-readable medium, such as a random access memory (RAM) (none shown in FIG. 2). Alternatively, one or more storage devices, such as a floppy disk, a compact disc read only memory (CD-ROM), a magneto-optical disk (MOD), and/or a digital versatile disc (DVD) (none shown in FIG. 2) may also be used. Also, in the exemplary embodiment, additional input channels (not shown in FIG. 2) may be, but are not limited to, computer peripherals associated with an operator interface such as a mouse and a keyboard (neither shown in FIG. 2). Further, in the exemplary embodiment, additional output channels may include, but are not limited to, an operator interface monitor (not shown in FIG. 2).

Processors for turbine controller 202 process information transmitted from a plurality of electrical and electronic devices that may include, but are not limited to, voltage and current transducers. RAM and/or storage devices store and transfer information and instructions to be executed by the processor. RAM and/or storage devices can also be used to store and provide temporary variables, static (i.e., non-changing) information and instructions, or other intermediate information to the processors during execution of instructions by the processors. Instructions that are executed include, but are not limited to, resident conversion and/or comparator algorithms. The execution of sequences of instructions is not limited to any specific combination of hardware circuitry and software instructions.

Generator stator 120 is electrically coupled to a stator synchronizing switch 206 via a stator bus 208. In an exemplary embodiment, to facilitate the DFIG configuration, generator rotor 122 is electrically coupled to a bi-directional power conversion assembly 210 via a rotor bus 212. Alternatively, generator rotor 122 is electrically coupled to rotor bus 212 via any other device that facilitates operation of electrical and control system 200 as described herein. As a further alternative, electrical and control system 200 is configured as a full power conversion system (not shown) that includes a full power conversion assembly (not shown in FIG. 2) similar in design and operation to power conversion assembly 210 and electrically coupled to generator stator 120. The full power conversion assembly facilitates channeling electric power between generator stator 120 and an electric power transmission and distribution grid (not shown). In the exemplary embodiment, stator bus 208 transmits three-phase power from generator stator 120 to stator synchronizing switch 206. Rotor bus 212 transmits three-phase power from generator rotor 122 to power conversion assembly 210. In the exemplary embodiment, stator synchronizing switch 206 is electrically coupled to a main transformer circuit breaker 214 via a system bus 216. In an alternative embodiment, one or more fuses (not shown) are used instead of main transformer circuit breaker 214. In another embodiment, neither fuses nor main transformer circuit breaker 214 is used.

Power conversion assembly 210 includes a rotor filter 218 that is electrically coupled to generator rotor 122 via rotor bus 212. A rotor filter bus 219 electrically couples rotor filter 218 to a rotor-side power converter 220, and rotor-side power converter 220 is electrically coupled to a line-side power converter 222. Rotor-side power converter 220 and line-side power converter 222 are power converter bridges including power semiconductors (not shown). In the exemplary embodiment, rotor-side power converter 220 and line-side power converter 222 are configured in a three-phase, pulse width modulation (PWM) configuration including insulated gate bipolar transistor (IGBT) switching devices (not shown in FIG. 2) that operate as known in the art. Alternatively, rotor-side power converter 220 and line-side power converter 222 have any configuration using any switching devices that facilitate operation of electrical and control system 200 as described herein. Power conversion assembly 210 is coupled in electronic data communication with turbine controller 202 to control the operation of rotor-side power converter 220 and line-side power converter 222.

In the exemplary embodiment, a line-side power converter bus 223 electrically couples line-side power converter 222 to a line filter 224. Also, a line bus 225 electrically couples line filter 224 to a line contactor 226. Moreover, line contactor 226 is electrically coupled to a conversion circuit breaker 228 via a conversion circuit breaker bus 230. In addition, conversion circuit breaker 228 is electrically coupled to main transformer circuit breaker 214 via system bus 216 and a connection bus 232. Alternatively, line filter 224 is electrically coupled to system bus 216 directly via connection bus 232 and includes any suitable protection scheme (not shown) configured to account for removal of line contactor 226 and conversion circuit breaker 228 from electrical and control system 200. Main transformer circuit breaker 214 is electrically coupled to an electric power main transformer 234 via a generator-side bus 236. Main transformer 234 is electrically coupled to a grid circuit breaker 238 via a breaker-side bus 240. Grid circuit breaker 238 is connected to the electric power transmission and distribution grid via a grid bus 242. In an alternative embodiment, main transformer 234 is electrically coupled to one or more fuses (not shown), rather than to grid circuit breaker 238, via breaker-side bus 240. In another embodiment, neither fuses nor grid circuit breaker 238 is used, but rather main transformer 234 is coupled to the electric power transmission and distribution grid via breaker-side bus 240 and grid bus 242.

In the exemplary embodiment, rotor-side power converter 220 is coupled in electrical communication with line-side power converter 222 via a single direct current (DC) link 244. Alternatively, rotor-side power converter 220 and line-side power converter 222 are electrically coupled via individual and separate DC links (not shown in FIG. 2). DC link 244 includes a positive rail 246, a negative rail 248, and at least one capacitor 250 coupled between positive rail 246 and negative rail 248. Alternatively, capacitor 250 includes one or more capacitors configured in series and/or in parallel between positive rail 246 and negative rail 248.

Turbine controller 202 is configured to receive a plurality of voltage and electric current measurement signals from a first set of voltage and electric current sensors 252. Moreover, turbine controller 202 is configured to monitor and control at least some of the operational variables associated with wind turbine 100. In the exemplary embodiment, each of three voltage and electric current sensors 252 are electrically coupled to each one of the three phases of grid bus 242. Alternatively, voltage and electric current sensors 252 are electrically coupled to system bus 216. As a further alternative, voltage and electric current sensors 252 are electrically coupled to any portion of electrical and control system 200 that facilitates operation of electrical and control system 200 as described herein. As a still further alternative, turbine controller 202 is configured to receive any number of voltage and electric current measurement signals from any number of voltage and electric current sensors 252 including, but not limited to, one voltage and electric current measurement signal from one transducer.

As shown in FIG. 2, electrical and control system 200 also includes a converter controller 262 that is configured to receive a plurality of voltage and electric current measurement signals. For example, in one embodiment, converter controller 262 receives voltage and electric current measurement signals from a second set of voltage and electric current sensors 254 coupled in electronic data communication with stator bus 208. Converter controller 262 receives a third set of voltage and electric current measurement signals from a third set of voltage and electric current sensors 256 coupled in electronic data communication with rotor bus 212. Converter controller 262 also receives a fourth set of voltage and electric current measurement signals from a fourth set of voltage and electric current sensors 264 coupled in electronic data communication with conversion circuit breaker bus 230. Second set of voltage and electric current sensors 254 is substantially similar to first set of voltage and electric current sensors 252, and fourth set of voltage and electric current sensors 264 is substantially similar to third set of voltage and electric current sensors 256. Converter controller 262 is substantially similar to turbine controller 202 and is coupled in electronic data communication with turbine controller 202. Moreover, in the exemplary embodiment, converter controller 262 is physically integrated within power conversion assembly 210. Alternatively, converter controller 262 has any configuration that facilitates operation of electrical and control system 200 as described herein.

During operation, wind impacts blades 108 and blades 108 transform wind energy into a mechanical rotational torque that rotatably drives low-speed shaft 112 via hub 110. Low-speed shaft 112 drives gearbox 114 that subsequently steps up the low rotational speed of low-speed shaft 112 to drive high-speed shaft 116 at an increased rotational speed. High speed shaft 116 rotatably drives generator rotor 122. A rotating magnetic field is induced by generator rotor 122 and a voltage is induced within generator stator 120 that is magnetically coupled to generator rotor 122. Generator 118 converts the rotational mechanical energy to a sinusoidal, three-phase alternating current (AC) electrical energy signal in generator stator 120. The associated electrical power is transmitted to main transformer 234 via stator bus 208, stator synchronizing switch 206, system bus 216, main transformer circuit breaker 214 and generator-side bus 236. Main transformer 234 steps up the voltage amplitude of the electrical power and the transformed electrical power is further transmitted to a grid via breaker-side bus 240, grid circuit breaker 238 and grid bus 242.

In the exemplary embodiment, a second electrical power transmission path is provided. Electrical, three-phase, sinusoidal, AC power is generated within generator rotor 122 and is transmitted to power conversion assembly 210 via rotor bus 212. Within power conversion assembly 210, the electrical power is transmitted to rotor filter 218 and the electrical power is modified for the rate of change of the PWM signals associated with rotor-side power converter 220. Rotor-side power converter 220 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple associated with AC rectification.

The DC power is subsequently transmitted from DC link 244 to line-side power converter 222 and line-side power converter 222 acts as an inverter configured to convert the DC electrical power from DC link 244 to three-phase, sinusoidal AC electrical power with pre-determined voltages, currents, and frequencies. This conversion is monitored and controlled via converter controller 262. The converted AC power is transmitted from line-side power converter 222 to system bus 216 via line-side power converter bus 223 and line bus 225, line contactor 226, conversion circuit breaker bus 230, conversion circuit breaker 228, and connection bus 232. Line filter 224 compensates or adjusts for harmonic currents in the electric power transmitted from line-side power converter 222. Stator synchronizing switch 206 is configured to close to facilitate connecting the three-phase power from generator stator 120 with the three-phase power from power conversion assembly 210.

Conversion circuit breaker 228, main transformer circuit breaker 214, and grid circuit breaker 238 are configured to disconnect corresponding buses, for example, when excessive current flow may damage the components of electrical and control system 200. Additional protection components are also provided including line contactor 226, which may be controlled to form a disconnect by opening a switch (not shown in FIG. 2) corresponding to each line of line bus 225.

Power conversion assembly 210 compensates or adjusts the frequency of the three-phase power from generator rotor 122 for changes, for example, in the wind speed at hub 110 and blades 108. Therefore, in this manner, mechanical and electrical rotor frequencies are decoupled from stator frequency.

Under some conditions, the bi-directional characteristics of power conversion assembly 210, and specifically, the bi-directional characteristics of rotor-side power converter 220 and line-side power converter 222, facilitate feeding back at least some of the generated electrical power into generator rotor 122. More specifically, electrical power is transmitted from system bus 216 to connection bus 232 and subsequently through conversion circuit breaker 228 and conversion circuit breaker bus 230 into power conversion assembly 210. Within power conversion assembly 210, the electrical power is transmitted through line contactor 226, line bus 225, and line-side power converter bus 223 into line-side power converter 222. Line-side power converter 222 acts as a rectifier and rectifies the sinusoidal, three-phase AC power to DC power. The DC power is transmitted into DC link 244. Capacitor 250 facilitates mitigating DC link 244 voltage amplitude variations by facilitating mitigation of a DC ripple sometimes associated with three-phase AC rectification.

The DC power is subsequently transmitted from DC link 244 to rotor-side power converter 220 and rotor-side power converter 220 acts as an inverter configured to convert the DC electrical power transmitted from DC link 244 to a three-phase, sinusoidal AC electrical power with pre-determined voltages, currents, and frequencies. This conversion is monitored and controlled via converter controller 262. The converted AC power is transmitted from rotor-side power converter 220 to rotor filter 218 via rotor filter bus 219 and is subsequently transmitted to generator rotor 122 via rotor bus 212, thereby facilitating sub-synchronous operation.

Power conversion assembly 210 is configured to receive control signals from turbine controller 202. The control signals are based on sensed conditions or operating characteristics of wind turbine 100 and electrical and control system 200. The control signals are received by turbine controller 202 and used to control operation of power conversion assembly 210. Feedback from one or more sensors may be used by electrical and control system 200 to control power conversion assembly 210 via converter controller 262 including, for example, conversion circuit breaker bus 230, stator bus and rotor bus voltages or current feedbacks via second set of voltage and electric current sensors 254, third set of voltage and electric current sensors 256, and fourth set of voltage and electric current sensors 264. Using this feedback information, and for example, switching control signals, stator synchronizing switch control signals and system circuit breaker control (trip) signals may be generated in any known manner. For example, for a grid voltage transient with predetermined characteristics, converter controller 262 will at least temporarily substantially suspend the IGBTs from conducting within line-side power converter 222. Such suspension of operation of line-side power converter 222 will substantially mitigate electric power being channeled through power conversion assembly 210 to approximately zero.

Figure 3:
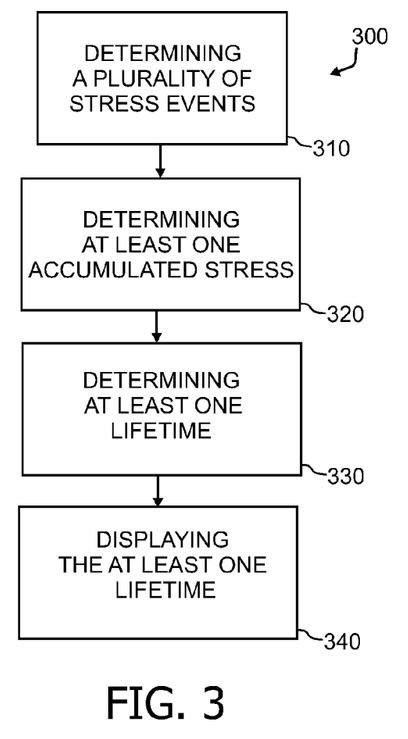
FIG. 3 is an exemplary diagram of a method of operating a wind turbine.

FIG. 3 is an exemplary flowchart to represent a method of operating at least one wind turbine 300. A plurality of stress events are determined 310, and at least one accumulated stress is determined 320 for example based at least partially on at least two of the plurality of stress events. At least one lifetime (e.g. a residual lifetime of the wind turbine) is determined 330 which is based at least partially on the at least one accumulated stress, and the at least one lifetime is optionally displayed 340.

In an embodiment, the stress events can be determined by the feedback from at least one component and/or active system in the wind turbine such as the active yaw system. For example, the stress can be related to the required or applied yaw torque to control the position of the nacelle, so that by determining the torque (e.g. an applied signal proportionate to the mechanical torque) applied on the nacelle during an orienting process (for example due to a change in wind direction), the stress event can be determined. Stress events from other components and systems of the wind turbine can also be determined; for example the pitch and/or generator are also subject to stress; pitch system torques, the generator, and drive train can also be used to determine stress events. Stress events can be recorded, for example by a computer and/or memory, and optionally time-stamped. For example a stress event record and/or determination may comprise any combination of: a time stamp, an ID of which wind turbine within a plurality of wind turbines received the stress event, an ID of the component receiving the stress event, an ID of the sub-component receiving the stress event (and sub-sub-component etc.), the magnitude of the stress event, and an indication of the disposition of the stress event (e.g. whether it is a compressive or tensile stress). Alternatively or additionally, the stress events can be determined and/or recorded at specified time intervals. Stress events may also be determined by the operation of sensors, such as strain gauges, which may be in communication with the controller or recording device. In an embodiment, a rainflow count algorithm can be used to determine the plurality of stress events of at least one component of the at least one wind turbine.

In an embodiment, an accumulated stress can be determined by performing a calculation based at least partially on at least two of the stress events. For example, a real-time algorithm, for example executed by a computer, microprocessor and/or controller, updates the accumulated stress based on a previously recorded accumulated stress that was based on at least one previous stress event. Alternatively or additionally, an algorithm calculates an accumulated stress based on a plurality of stresses, which may be recorded. The algorithm can be based on a rainflow counting algorithm, for example.

In an embodiment, at least one accumulated stress can be determined (e.g. calculated), for example an accumulated stress of any one or more of the following components: a yaw component, the yaw system, the generator, drive train, and pitch system, and components thereof. For example, the determined (e.g. recorded) stresses of each component are used in determining each component's accumulated stress, yielding a plurality of accumulated stresses, each associated with a particular component. Furthermore, each accumulated stress can also be associated with a particular wind turbine in a wind farm. The accumulated stresses may take the form of a scalar value, an array of scalar values, a vector, and/or a matrix. Furthermore, the accumulated stresses can take the form of multidimensional arrays, such as for example, for each wind turbine and component thereof, a histogram of stress magnitudes reached in the plurality of stress events, optionally recorded over a duration of wind turbine (and/or wind farm) operation.

Figure 4:
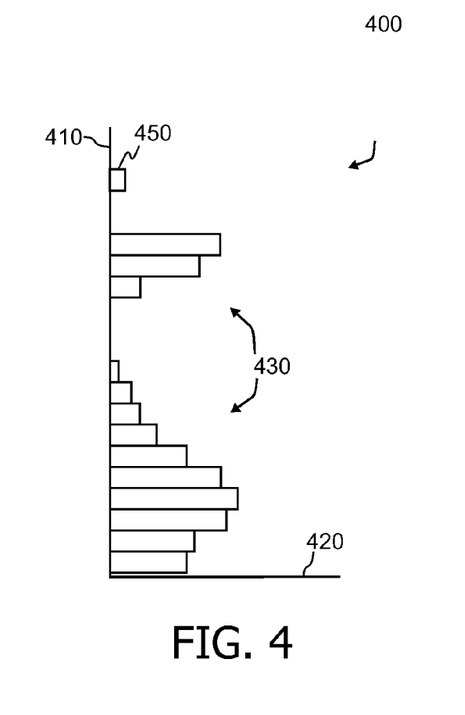
FIG. 4 is an exemplary stress histogram.

FIG. 4 shows an exemplary histogram 400 of stress events, e.g. a histogram of magnitudes of a plurality of stress events, chosen arbitrarily so as to aid in the detailed description, and are not intended to be limiting. The position of the bins 430 on the vertical axis 410 indicates the magnitude or range of magnitudes of the stress events. The horizontal length, parallel to the horizontal axis 420, of the bins represent the number of stress events, which may be full stress cycles or half-cycles or the like. Thus, for example, determinations regarding the number of stress events of a given stress (e.g. a given range of stress) can be represented by each bin, and each bin of the histogram can determine the number of stress events within a given range of stress or near an average stress of the range illustrated by the width of the bin. For example the top-most bin 450 may represent n (e.g. n=30) stress events within a range of stress magnitude corresponding to the width of the bin (in the vertical direction) and placement thereof on the vertical axis of FIG. 4. Other stress events that occur at lesser stress magnitudes are also illustrated in FIG. 4, according to their magnitudes and number of events, in the other bins. Histograms such as that illustrated in FIG. 4 can serve as the accumulated stress that is determined 320 for example in a method of operating at least one wind turbine 300 as illustrated in FIG. 3. Alternatively or additionally, the determination of at least one accumulated stress is based on at least partially the histrogram of stress events. In an embodiment, determining the plurality of stress events 310 produces a histogram of stress events.

In an embodiment, a rainflow counting algorithm can be used for determining the accumulated stress 320 and/or the lifetime 330 such as the residual lifetime.

Figure 5:
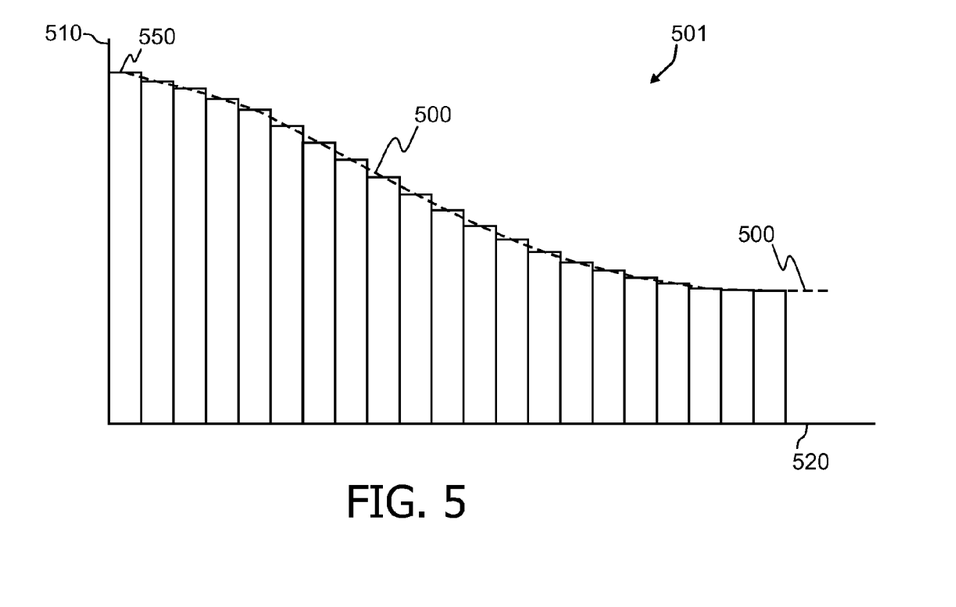
FIG. 5 is an exemplary S-N curve and S-N histogram.

FIG. 5 shows an exemplary known or estimated S-N curve 500, or Wöhler curve, and a corresponding S-N histogram 501. The vertical axis 510 represents a variable stress magnitude, and the horizontal axis 520 represents the number of cycles to failure and/or breakage. For example, the left-most bin 550 represents the highest range of stress, or highest average stress, for which there are the fewest number of cycles to failure. Generally, the number of cycles to failure increases as the magnitude of the stress decreases, as is illustrated by the progressively smaller bins as the S-N histogram is read from left to right. Typically the S-N curve becomes flat at small values of stress, so that stress events of low magnitude (i.e. weakly stressful events) contribute little, possibly negligibly, to the accumulated stress.

A lifetime, such as at least one of a consumed lifetime and a residual lifetime, can be determined based at least partially on an accumulated stress, for example by comparing the accumulated stress to a design value and/or predicted stress, which can be based at least partially on design parameters such as a known or estimated S-N curve or histogram (i.e. relations between stress magnitudes and number of cycles thereof to failure).

Alternatively or additionally, Miner's rule or a variant thereof can be used to estimate a lifetime. For example, in the following equation for accumulated stress, AS, $$AS = \sum_{i=1}^{k} \frac{n_i}{N_i};$$

i is an index for example corresponding to the plurality of stresses illustrated in the bins of the histogram of FIG. 4 over which the summation is made; k is the number of bins; $n_i$ is the number of stress events at a given stress magnitude (e.g. given by the length of the $i^{th}$ bin of FIG. 4); $N_i$ is the number of stress events of a given magnitude that will cause a failure (e.g. given by the position on the horizontal axis of the corresponding bin of FIG. 5 [i.e. the bin of FIG. 5 with the same stress magnitude as the $i^{th}$ bin of FIG. 4]). In an embodiment, the consumed lifetime is the same scalar value as the accumulated stress, AS; optionally, the residual lifetime is 1−AS. Lifetimes expressed thusly can be considered fractional lifetimes, so that when AS=1, the component can be considered as having accumulated stress events so that it has reached its lifetime (e.g. expected lifetime or expected working lifetime).

In an embodiment, the accumulated stress AS is compared to a predicted stress, $C_p$, (for example $C_p$=1), making a comparison (e.g. AS/$C_p$ or AS/1). A predicted stress, $C_p$, from approximately 0.7 to 1.5 can be used, such as 0.8, 0.9, 1.1, or 1.2, so that a ratio for example, e.g. AS/$C_p$, can be the comparison. In an embodiment, a consumed lifetime can be expressed as being at least partially deter mined from a predicted or design lifetime, $\tau_0$, such as $\tau_{consumed}$=(AS/$C_p$)$\tau_0$; alternatively or additionally a residual lifetime can be expressed as $\tau_{residual}$=(1−AS/$C_p$)$\tau_0$. The residual lifetime can be optionally displayed, and optionally used at least partially as the basis for adjusting at least one operational setting of any of the at least one wind turbine.

In an embodiment, the at least one accumulated stress is compared to a predicted stress to make a comparison. The comparison can optionally be at least part of the basis for at least one of: adjusting at least one operational setting of the at least one wind turbine, and determining whether to wait or adjust at least one operational setting of the at least one wind turbine. In an embodiment, the stress events are determined from at least one component of: pitch, yaw, drive train, and generator components.

For example, a wind turbine component has a design lifetime or predicted lifetime of $\tau_0$ years (e.g. $\tau_0$=20 years), at which the predicted accumulated stress, or predicted stress, of the component has a value of $C_{p0}$ (e.g. $C_{p0}$=1), and the component has a known or predicted S-N curve. At time t, a plurality of stress events of the component have been or are determined, and are used to determine an accumulated stress, $AS_t$. The accumulated stress can optionally be used to determine a residual lifetime, $\tau_{rt}$=(1−$AS_t$/$C_p$)$\tau_0$. Alternatively or additionally, the accumulated stress can be used to determine a comparison, such as the ratio of residual lifetime at time t to the predicted residual lifetime at time t, for example, comparison=$\tau_{rt}$/$\tau_{rot}$, where $\tau_{rot}$=$\tau_0$−t, i.e. $\tau_{rot}$ is the expected residual lifetime at time t. For example, a comparison >1 can indicate that the residual lifetime is more than the predicted residual lifetime, and a comparison <1 can indicate that the residual lifetime is less than the predicted residual lifetime. In an embodiment, a determination as to whether to wait or adjust at least one operational setting of the wind turbine can be made at least partially on the comparison. Alternatively or additionally, an adjustment to at least one operational setting of the wind turbine can be made at least partially on the comparison.

In an embodiment, a consumed lifetime is determined at least partially on the basis of the at least one accumulated stress. Optionally, the consumed lifetime is displayed, and/or used at least partially as the basis for adjusting at least one operational setting of the wind turbine. For example, the consumed lifetime is compared to a predicted consumed lifetime. If, at time t, the consumed lifetime is greater than the predicted consumed lifetime, an operational setting can be optionally adjusted in order to reduce the likelihood and/or magnitude of stress events, e.g. future stress events; otherwise, an operational setting can be optionally adjusted in order to increase energy production.

Figure 6:
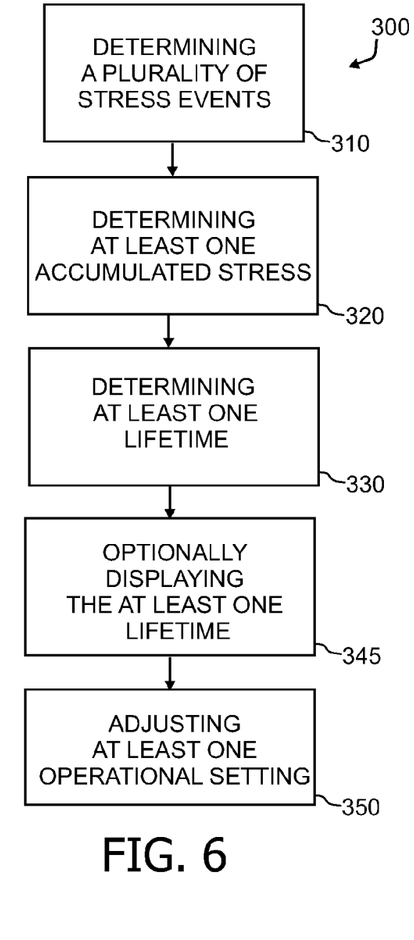
FIG. 6 is an exemplary diagram of a method of operating a wind turbine.

FIG. 6 illustrates an exemplary flowchart to represent a method of operating at least one wind turbine 300. A plurality of stress events are determined 310, and at least one accumulated stress is determined 320 for example based at least partially on at least two of the plurality of stress events. At least one lifetime (e.g. a residual lifetime of the wind turbine) is determined 330 which is based at least partially on the at least one accumulated stress, and the at least one lifetime is optionally displayed 345. At least one operational setting is adjusted 350, which can be based on at least one of the following: a lifetime such as residual or consumed lifetime; an accumulated stress; and a comparison such as a comparison of an accumulated stress and a predicted stress, a residual lifetime and a predicted residual lifetime, and/or a consumed lifetime and a predicted consumed lifetime and a past or projected annual energy production. It is contemplated that the determination of lifetimes can be based on accumulated stress and/or comparisons of accumulated stress, as previously explained.

Figure 7:
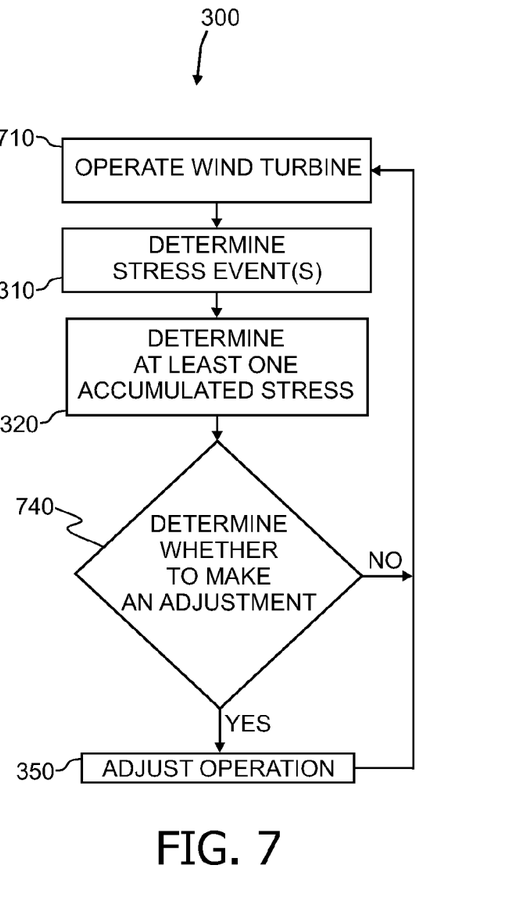
FIG. 7 is an exemplary diagram of a method of operating a wind turbine.

FIG. 7 illustrates an exemplary flowchart to represent a method of operating at least one wind turbine 300. A wind turbine is operated 710, and a plurality of stress events are determined 310. At least one accumulated stress is determined 320 for example based at least partially on at least two of the plurality of stress events. A determination whether to make an adjustment 740 is made, which can be based on at least one of the following: a lifetime such as residual or consumed lifetime; an accumulated stress; and a comparison such as a comparison of an accumulated stress and a predicted stress, a residual lifetime and a predicted residual lifetime, and/or a consumed lifetime and a predicted consumed lifetime. Optionally, the adjustment to the operation of at least one wind turbine is made 350.

In an embodiment, an adjustment to the operation of at least one wind turbine 350 is made after a finite number of cycles of steps of operating a wind turbine 710, determining stress event(s) 310, determining at least one accumulated stress 320 and determining whether to make an adjustment 740.

In an example, a wind park of a number of wind turbines is operating, and accumulated stresses are determined for each of the wind turbines. The accumulated stresses from each wind turbine is compared with the accumulated stress from every other wind turbine. The operational settings of at least one of the wind turbines is adjusted, which changes the load distribution among at least two of the wind turbines. For example, if a first wind turbine is upwind from a second wind turbine, and the accumulated stress of the first wind turbine is greater than the accumulated stress of the second wind turbine, the operational settings of the first wind turbine are adjusted to reduce stress on it, which changes the load distribution among the first and second wind turbine. For example, the load on the first wind turbine is reduced, and the second wind turbine is increased. Alternatively or additionally, the consumed or residual lifetimes of the wind turbines are compared, and adjustments are made to reduce the stress on wind turbines with relatively high consumed lifetimes (and/or relatively low residual lifetimes) by changing the load distribution among the wind turbines. In an embodiment, the adjustment of the operational setting reduces the inequality of the load distribution among at least two wind turbines.

A wind turbine or wind turbine park adapted for the operational methods described herein are also contemplated. For example, a wind turbine is contemplated, comprising: a tower supporting a nacelle, the nacelle supporting at least one blade for receiving wind energy, and at least one controller adapted for the methods of controlling a wind turbine disclosed herein, for example in FIGS. 3, 6, and 7. For example, the controller: determines a plurality of stress events of at least one component of the wind turbine (such as a pitch, yaw, or generator component), determines at least one accumulated stress from at least two of the stress events. Typically, the controller determines at least one of: at least one residual lifetime, at least one consumed lifetime; and the lifetimes are at least partially based on the accumulated stress. Optionally, the controller adjusts at least one operational setting, for example the controller determines whether to make an adjustment based on the residual lifetime and/or the consumed lifetime. A wind park comprising a plurality of wind turbines is also contemplated.

The above-described systems and methods facilitate operating a wind turbine or wind park. More specifically, the accumulated stress on a wind turbine or group of wind turbines is determined and can be used to determine whether to adjust the operational settings. Furthermore, the operational settings can be adjusted based on the accumulated stress, which can have the increase energy capture, reduce stress, and/or increase the operational lifetime.

Exemplary embodiments of systems and methods for operating at least one wind turbine are described above in detail. The systems and methods are not limited to the specific embodiments described herein, but rather, components of the systems and/or steps of the methods may be utilized independently and separately from other components and/or steps described herein. For example, methods of operating wind turbines are provided, and are not limited to practice with only the wind turbine systems as described herein. Rather, the exemplary embodiment can be implemented and utilized in connection with many other rotor blade applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of operating at least one wind turbine, comprising:
    determining, via one or more sensors, a plurality of stress events of at least one component of the at least one wind turbine;
    calculating, via a computer-implemented rainflow counting algorithm programmed in a controller, at least one accumulated stress from at least two of the plurality of stress events;
    determining, via the controller, a ratio of the at least one accumulated stress to a predicted stress of the at least one component;
    determining, via another computer-implemented rainflow counting algorithm programmed in the controller, at least one residual lifetime based at least partially on the ratio; and
    adjusting at least one operational setting of the at least one wind turbine based on the at least one residual lifetime, the operational setting comprising at least one of a power level, a pitch angle, a yaw angle, or a generator speed of the wind turbine.

2. The method of claim 1, further comprising determining whether to wait or to adjust the at least one operational setting of the at least one wind turbine based on the at least one residual lifetime.

3. The method of claim 1, further comprising determining whether to wait or to adjust the at least one operational setting of the at least one wind turbine based on the comparison.

4. The method of claim 1, wherein the at least one component is a pitch, yaw, or generator component.

5. The method of claim 1, wherein determining the plurality of stress events further comprises producing a histogram of stress events.

6. The method of claim 5, wherein the determining at least one accumulated stress is based on at least partially the histogram of stress events.

7. A method of operating at least one wind turbine, comprising:
    determining, via one or more sensors a plurality of stress events of at least one component of the at least one wind turbine;
    calculating, via a controller, at least one accumulated stress from at least two of the plurality of stress events;
    determining, via the controller, a ratio of the at least one accumulated stress to a predicted stress of the at least one component;
    determining, via a computer-implemented rainflow counting algorithm programmed in the controller, at least one residual lifetime based at least partially on the ratio; and
    adjusting at least one operational setting of any of the at least one wind turbine based on the at least one residual lifetime, the operational setting comprising at least one of a power level, a pitch angle, a yaw angle, or a generator speed of the wind turbine.

8. The method of claim 7, further comprising determining a consumed lifetime at least partially based on the at least one accumulated stress, wherein the adjusting is at least partially based on the consumed lifetime.

9. The method of claim 8, further comprising:
    determining whether to make an adjustment to at least one operational setting of the wind turbine based at least partially on the at least one accumulated stress, and
    adjusting at least one operational setting of at least one wind turbine based on the consumed lifetime.

10. The method of claim 7, further comprising adjusting at least one operational setting of at least two wind turbines so as to change a load distribution among the at least two wind turbines, and wherein the adjusting step reduces an inequality of the load distribution among the at least two wind turbines.

11. The method of claim 7, wherein the adjusting is further based at least partially on an annual energy production.

12. The method of claim 7, wherein the at least one component is a pitch, yaw, or generator component.

13. The method of claim 7, wherein the determining a plurality of stress events of at least one component of the at least one wind turbine is based at least partially on another rainflow counting algorithm.

14. The method of claim 7, wherein determining the plurality of stress events of at least one component of the at least one wind turbine further comprises producing a histogram of stress events.

15. A wind turbine comprising:
    a tower supporting a nacelle, wherein the nacelle supports at least one blade for receiving wind energy, and
    at least one controller adapted for
        determining, via one or more sensors, a plurality of stress events of at least one component of the wind turbine, wherein the at least one component is a pitch, yaw, or generator component,
        calculating, via a computer-implemented rainflow counting algorithm programmed in the controller, at least one accumulated stress from at least two of the plurality of stress events,
        determining, via the controller, a ratio of the at least one accumulated stress to a predicted stress of the at least one component;
        determining, via another computer-implemented rainflow counting algorithm programmed in the controller, at least one residual lifetime based at least partially on the ratio, and
        adjusting at least one operational setting of the wind turbine based on the at least one residual lifetime, the operational setting comprising at least one of a power level, a pitch angle, a yaw angle, or a generator speed of the wind turbine.

16. The wind turbine of claim 15, wherein the controller is further adapted for:
    determining a consumed lifetime at least partially based on the at least one accumulated stress, and
    determining whether to make an adjustment to at least one operational setting based on at least one of: the residual lifetime or the consumed lifetime.

* * * * *

UNITED STATES PATENT AND TRADEMARK OFFICE
CERTIFICATE OF CORRECTION

PATENT NO. : 9,605,654 B2  
APPLICATION NO. : 13/556234  
DATED : March 28, 2017  
INVENTOR(S) : Wickström Page 1 of 1

It is certified that error appears in the above-identified patent and that said Letters Patent is hereby corrected as shown below:

In the Claims

In Column 13, Line 43, in Claim 7, delete "sensors a" and insert -- sensors, a --, therefor.

In Column 14, Line 31, in Claim 15, delete "energy," and insert -- energy; --, therefor.

In Column 14, Line 32, in Claim 15, delete "for" and insert -- for: --, therefor.

In Column 14, Line 57, in Claim 16, delete "stress," and insert -- stress; --, therefor.

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*